United States Patent [19]

Costes

[11] Patent Number: 4,508,678
[45] Date of Patent: Apr. 2, 1985

[54] LIQUID METAL-COOLED NUCLEAR REACTOR

[75] Inventor: Didier Costes, Meudon, France

[73] Assignee: Commissariat a l'Energie Atomique, Paris, France

[21] Appl. No.: 337,746

[22] Filed: Jan. 7, 1982

[30] Foreign Application Priority Data

Jan. 20, 1981 [FR] France .................. 81 00963

[51] Int. Cl.³ .................. G21C 11/00; G21C 13/06
[52] U.S. Cl. .................. 376/205; 376/260; 376/293; 376/404; 376/463
[58] Field of Search .............. 176/62, 63, 64, 65, 176/87; 376/403, 404, 405, 406, 460, 463, 206, 376/270, 260, 205, 293; 417/424

[56] References Cited

U.S. PATENT DOCUMENTS

| | | | |
|---|---|---|---|
| 4,192,717 | 3/1980 | Gross | 220/3 |
| 4,295,934 | 10/1981 | Robin | 376/403 |

FOREIGN PATENT DOCUMENTS

| | | | |
|---|---|---|---|
| 0058583 | 1/1982 | European Pat. Off. | 376/404 |
| 1325733 | 3/1962 | France | 376/462 |
| 1429819 | 4/1965 | France | 376/402 |
| 1501741 | 5/1966 | France | 376/406 |
| 2133530 | 12/1972 | France | 376/405 |
| 2196506 | 3/1974 | France | 376/402 |
| 1449842 | 9/1976 | United Kingdom | 376/404 |

OTHER PUBLICATIONS

*Fast Reactor Technology: Plant Design*, The M.I.T. Press, Massachusetts Institute of Tech., Work starts on Superphenix at the Creysmalville Site, M. Banal, Nersa. Nuclear Safety, vol. 16, No. 5, 1975, Washington, D.C. Atoomenergie, vol. 4, No. 6, 1962, Zwolle, Netherlands.
Nuclear Engineering International, vol. 23, No. 272, 1978.
*Pumps for Nuclear Power Plant*, The Institution of Mechanical Engineers, 1974.

*Primary Examiner*—Harvey E. Behrend
*Assistant Examiner*—Richard W. Wendtland
*Attorney, Agent, or Firm*—Michael N. Meller

[57] ABSTRACT

The invention relates to a fast neutron nuclear reactor in which the primary pumps and exchangers are suspended on the rigid slab sealing the vessel containing the reactor core.

The slab has in its thickness housings of reduced dimensions in which are confined the heads of the exchangers and the primary pumps. The flywheels of the pumps and part of the pipes of the secondary circuits are also contained in the housings. Other housings can be provided in the slab, particularly for the handling of fuels.

Application to the improvement of the safety and reliability of fast neutron reactors is taught.

2 Claims, 3 Drawing Figures

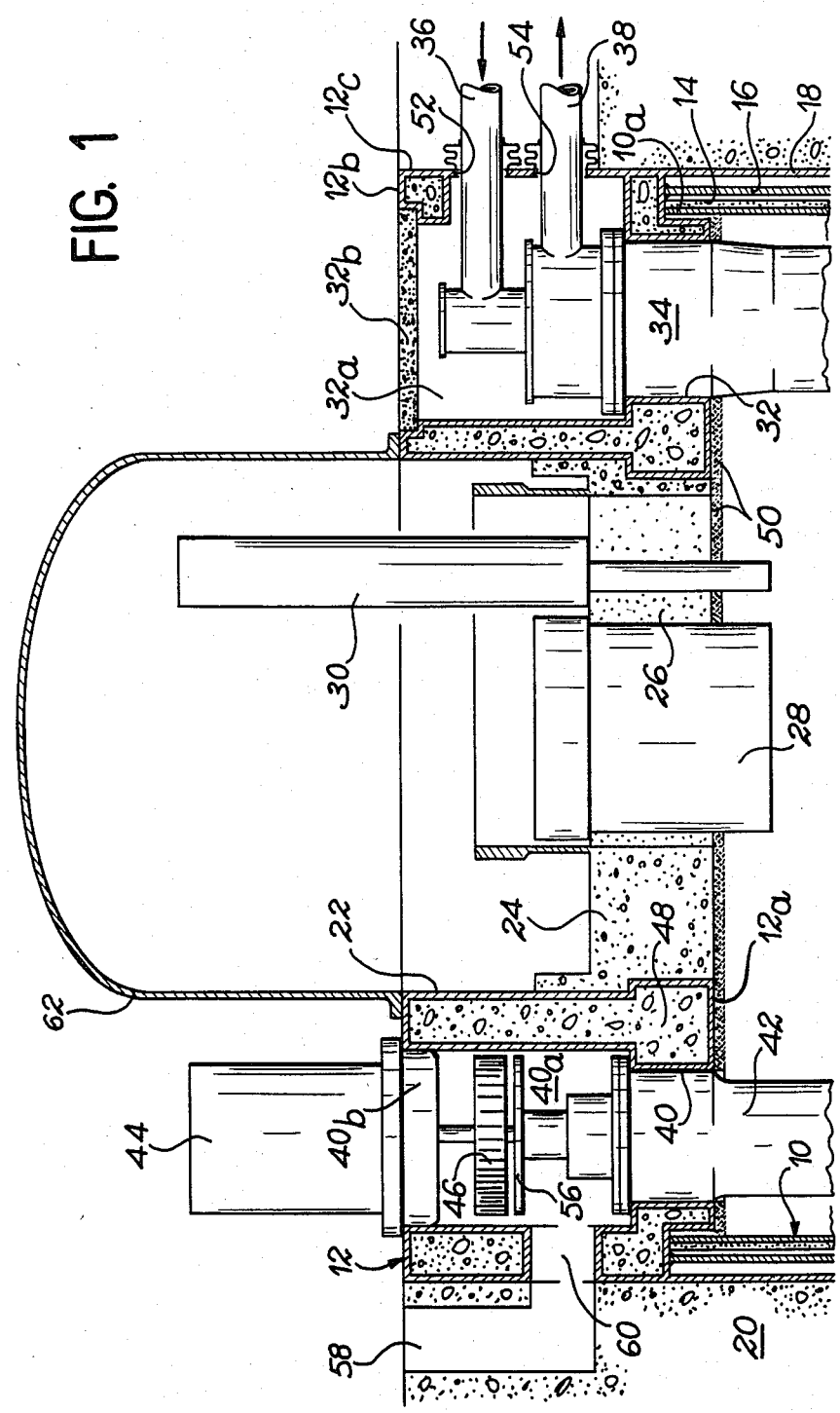

LIQUID METAL-COOLED NUCLEAR REACTOR

BACKGROUND OF THE INVENTION

The present invention relates to a nuclear reactor cooled by a liquid metal of the type comprising a vessel filled with liquid metal, whose upper part is sealed by a rigid slab which supports the heat exchangers and the pumps of the primary circuit.

More specifically the invention relates to an integrated fast neutron nuclear reactor, i.e. of the type in which the complete primary circuit of the reactor is housed in the vessel. In this type of reactor, the core thereof containing the fuel assemblies rests on the bottom of the vessel or on its periphery by means of a support for the supply of liquid metal (generally sodium) and a plate system. The liquid sodium is heated in the core by the fission reaction of the nuclear fuel before entering a hot collector placed above the core. It then circulates in heat exchangers in which it transmits a large part of its heat to the fluid (generally sodium) flowing in the secondary circuits. The cooled primary sodium leaving the lower part of the heat exchangers in a cold collector is sucked in by primary pumps, which reinject it into the support. In this type of reactor, the exchangers and primary pumps are generally suspended on the slab sealing the reactor vessel. The same applies with regards to a certain number of other members necessary for the operation or safety of the reactor, including the exchangers for cooling the reactor when it is shut down.

In known manner the slab sealing the vessel is constituted by a welded sheet metal structure forming a group of concrete-filled cavities in order to constitute a neutron protection and contribute to the rigidity of the slab. The lower face of the slab is provided with a cooling circuit and a lower thermal insulation covering immersed in the neutral gas above the liquid metal at approximately 500° C. This face can then be kept at a temperature which does not exceed e.g. 100° C. The thickness of the slab, which is fixed in such a way that an adequate strength and displacements which are sufficiently reduced during the temperature variations of the lower face are obtained is approximately 2.50 m for large reactors with an electric power of 1000 to 1500 MW. The exchangers and primary pumps are installed in a group of orifices or vertical shafts passing through the slab and having a diameter which is sufficient to permit their vertical introduction. In their part corresponding to the thickness of the slab, these components have sealing, as well as thermal and neutron protection members ensuring a functional continuity with the slab. The heads of these components, which are specific to their operation (motors for the pumps, connections to the secondary circuits, etc.) are positioned above the slab, as well as the system of circuits. A slab formed in this way is considered to be thin because every effort is made to reduce the heights devoted to neutron insulation and supporting functions, both with respect to the slab in order to facilitate the overall design and on the components, whose total height considerably influences the cost and ease of handling.

A structure formed in this way with a thin slab in stages and an upper area for the heads of the components suffers from several disadvantages. Firstly the group of equipment and heads of components above the slab are vulnerable to impacts and shocks taking place during the handling of heavy objects above the slab. In addition, the thus heightwise exposed heads of exchangers can only be protected from possible secondary sodium leaks leading to a fire by adding a doubling envelope, which is onerous and makes it more difficult to regularly inspect the main wall. Moreover, for a given strength, the thinness of the slab makes it necessary to use more steel than if freedom existed with regards to the thickness. Furthermore, to limit heightwise displacements linked with expansion of the lower plate, this thinness imposes severe constraints with regards to its temperature. Finally the cavities within the slab, which are entirely filled with concrete cannot be inspected.

BRIEF SUMMARY OF THE INVENTION

The present invention relates to a liquid metal-cooled nuclear reactor, which obviates the disadvantages referred to hereinbefore in connection with the hitherto known reactors with a relatively thin slab. More specifically the invention relates to the construction of a reactor in which the slab sealing the vessel substantially forms a flat floor preventing any risk of impact during handling operations above the slab, whilst ensuring an individual confinement of the heads of the exchangers permitting a direct inspection of the primary wall.

To this end the present invention proposes a liquid metal-cooled nuclear reactor comprising a vessel filled with liquid metal and whose upper part is sealed by a rigid slab having a central opening in which is housed at least one rotary plug overhanging the reactor core and first peripheral openings arranged in the form of a ring around the central opening and by which are suspended heat exchangers, wherein at least one of said first peripheral openings has, in the thickness of the slab, a lower part by which is suspended one of the heat exchangers and a first upper housing by which is confined the exchanger head, said first housing being sealed by a cover above the exchanger head.

It is clear that in a reactor constructed in this way due to the individual confinement of the exchanger heads a high degree of safety and reliability is obtained with respect to sodium leaks and impacts due to handling operations carried above the slab. In addition, these characteristics make it possible to simplify the heads of the exchangers by eliminating their double-walled fairing so that the primary wall can be directly inspected e.g. by a television camera. Moreover, the increase in the thickness of the slab compared with the prior art reactors, which increase is rendered necessary by the use of the above-indicated housings, makes it possible for a given mass of metal, to increase the strength and the rigidity of the slab, subject to maintenance of the necessary strength of the radial positions which exist between the housings on the whole height of the slab. This increase of the thickness of the slab, e.g. until 6 m, also makes it possible to much more easily perform the protective fillings because it makes the metal structures of the slab much more easily accessible for human intervention. Finally these characteristics make it possible to construct a flat floor around the rotary plug, which facilitates operation.

The housings in which the exchanger heads are received can be extended radially for the passage of the pipes of the secondary cooling circuit, until a cylindrical wall surrounding the slab, said wall being traversed by the pipes through external tight packings. The exchanger heads and the pipes being thus confined within these housings, the double walls required in the prior art reactors can be suppressed.

According to another feature of the invention, the slab having in its thickness second peripheral openings by which are suspended pumps, at least one of these second peripheral openings having, in the thickness of the slab, a lower part by which is suspended one of said pumps, and a second upper housing by which is confined the head of said pump, constituted by the going out of the pump shaft and by the required tightness, and at least a position of the driving members constituted by a drive shaft, possibly a flywheel, and a motor, this second housing being sealed by a cover above the pump head. It is favourable to locate the flywheel in the housing to limit the consequences of possible breaking. According to the particular case, the motor driving the rotating shaft can either be confined in the second housing, or can be placed outside said housing above the cover. The latter solution has the advantage of cooling the motor and of not excessively increasing the thickness of the slab due to the overall dimensions of such motors.

According to another feature of the invention in the thickness of the slab there is a third housing for handling fuels, said third housing being connected to the interior of the vessel and to a fuel handling installation by two transfer devices.

According to yet another feature of the invention it is also possible to cover the rotary plug of a detachable cover fixed to the slab, said cover being more particularly shaped like a dome.

BRIEF DESCRIPTION OF THE DRAWINGS

The invention is described in greater detail hereinafter relative to non-limitative embodiments and with reference to the attached drawings, wherein show:

FIG. 1 a sectional view of the slab of a fast neutron nuclear reactor according to the invention, showing the installation of a primary pump and an intermediate exchanger.

DETAILED DESCRIPTION OF THE PREFERRED EMBODIMENTS

Figure 2A:
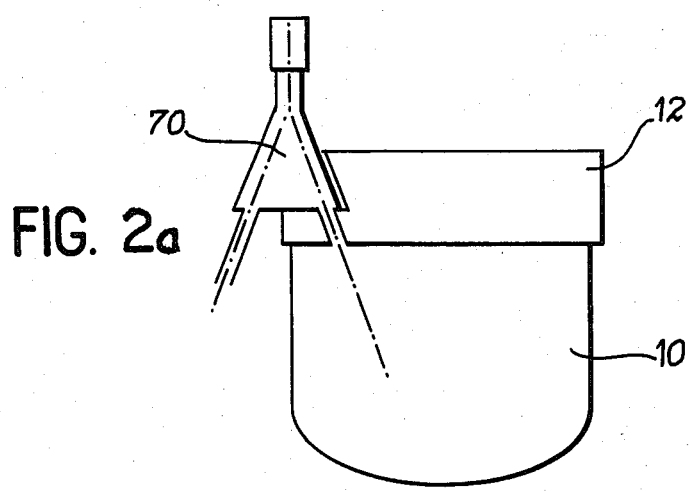
FIG. 2a a diagrammatic sectional view of a reactor slab according to the invention hollowed out for receiving a device for the transfer of fuel elements identical to that in a reactor, whose slab is in accordance with the prior art.

It is assumed that the general design of an integrated sodium-cooled, fast neutron nuclear reactor is known and a detailed description thereof is provided in the Journal "Nuclear Engineering International", vol. 23, No. 272, June 1978.

The complete reactor below the slab is not shown, it only being possible to see its main attachments to the slab. It is assumed that the reactor is contained in a hot vessel attached beneath the slab. However, the description can easily also relate to other types of support. According to the prior art the complete primary circuit is confined in a vertically axed main vessel 10 with a hot wall connected to the slab 12 kept cool by a ferrule 10a having a thermal gradient. Vessel 10 is externally provided with a thermal insulation layer 14 and it is surrounded by a normally cold, safety vessel 16 which is also attached to slab 12. A cylindrical steel skirt 18 surrounds safety vessel 16 and supports the slab 12 as from the not shown bed or floor of the installation. Skirt 18 is cooled by a not shown device and it is surrounded by a concrete neutron protection cylinder 20 rising up round slab 12.

Slab 12 is perforated by a group of openings or vertical shafts used for the fixing of large components. The central opening 22 overhanging the core of the reactor (not shown) serves to carry a large rotary plug 24, which itself carries the small rotary plug 26, traversed by the control plug 28 equipped with not shown control rods and by at least one vertical fuel handling apparatus 30. As a result of the combined rotations of the two rotary plugs 24 and 26, apparatus 30 makes it possible to transfer fuel elements from the reactor between a not shown fixed base located to the side of the core and any desired location in the latter. The drawing shows one of the shafts or peripheral openings 32 in slab 12 fixing an intermediate exchanger 34 supplied with tepid secondary sodium by means of pipe 36 and externally supplying hot secondary sodium by means of pipe 38. It is also possible to see one of the shafts or peripheral openings 40 in slab 12 fixing the primary pump 42, which is driven by electric motor 44, a flywheel 46 being fixed to the shaft in order to ensure a slow decrease of pumping in the case of an electric failure.

The slab is constructed from welded steel sheets, constituting recesses or internal spaces and each recess is provided in its floor with a lining of neutron-absorbing material. The internal spaces other than the shafts are at least partly lined with neutron-absorbing materials, such as concrete 48. The lower face 12a protected by a thermal insulation covering 50 is cooled by a not shown cooling circuit. All the above arrangements are in accordance with the prior art.

According to the present invention the thickness of slab 12 is increased compared with the prior art. It can be close to 6 m instead of 2.50 m in the known reactors of this type. As illustrated by FIG. 1, this feature makes it possible to provide in the slab thickness above each of the shafts 32 in which are fixed the exchangers 34, a housing 32a for the corresponding exchanger head, and above each of the shafts 40 in which are fixed the primary pumps 42, a housing 40a for the head of the corresponding pump and its flywheel 46. The plane shape of each housing is conditioned by the mechanical conception of the rigid slab, the metallic partitions connecting the lower face 12a to the upper face 12b, said partitions being for example purely radial and thus delimiting adjacent housings surrounding the central opening for the rotary plugs. Such plane partitions are indicated on FIG. 1 for the housings 32a and 40a. Each housing 32a is sealed by a detachable cover 32b flush with the upper face 12b of the slab. For each of the exchangers 34, the secondary sodium pipes 36, 38 move radially away from the reactor, whilst traversing the lateral metal wall 12c of the slab by orifices 52 and 54 equipped with metal sealing bellows between the wall and the pipes in order to ensure the seal with respect to the outside of housing 32a and so as to be able to fill it with inert gas.

Each housing 40a comprises an upper portion of revolution, the wall of which portion being only at a limited distance from the corresponding flywheel 46 in order to reduce impact in the case of any fracture of the latter. Housings 40a are subdivided into two in the heightwise direction by a sealing floor 56 integral with the pump head and positioned below flywheel 46, so as to support the shattered flywheel during its deceleration. Moreover, each housing 40a is closed in its upper part by a cover 40b integral with motor 44 in the represented variant. Obviously motor 44 can be placed above the cover, as shown in FIG. 1, or in housing 40a if the dimensions of the latter permit. It is possible to visit housing 40a as a result of manhole 58 and gallery 60.

The central opening 22 for the rotary plugs can be provided with a detachable dome-shaped cover 62 in order to provide a supplementary confinement if this is considered useful.

Figure 2B:
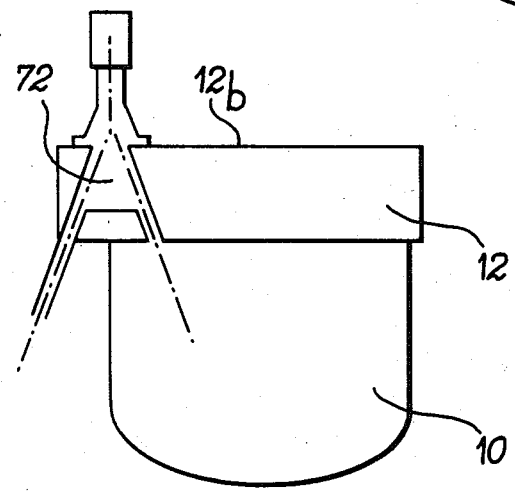
FIG. 2b a diagrammatic sectional view of a reactor slab according to the invention, integrating a modified transfer device.

All the other vertical penetrations existing in the relatively thin slabs according to the prior art can be reproduced with the present thick slab by modifications which are obvious to the Expert. In particular in an integrated reactor under construction, there are transfer ramps for the fuel elements leading to a swinging or tilting system placed above the slab. FIG. 2a diagrammatically shows a main reactor vessel 10 surmounted by a thick slab 12 according to the invention, which is laterally hollowed out to receive a swinging system 70 identical to that of the prior art. However, preference may be given to an arrangement according to FIG. 2b, which instead has a laterally extended fixing slab for defining a housing cavity 72 for the swinging device. Obviously the thick slab can be adapted so as to receive other fuel element transfer devices and ingenuity can be used for reducing the neutron shielding constraints of such apparatus by reducing their height and concealing them completely beneath the flat upper floor 12b of slab 12.

In particular the following advantages result from the slab of the reactor according to the invention:

The individual protection of the exchanger heads, each in a cavity sealed by a cover, means that they are not exposed to impacts which could result from handling errors in connection with heavy objects.

The individual confinement of the exchanger heads, each of which is positioned in its own cavity, can easily be effected in neutral gas to eliminate any fire risk, without it being necessary to add a special fairing and whilst permitting continuous inspection by a television camera.

The heads of the pumps and their flywheels are also not exposed to accidental impacts and only the pump motors could be exposed.

The embedding of the pump flywheels in robust cavities provides security against their possible shattering.

The requisite heights in each large component for ensuring an appropriate neutron protection can be reduced because said component is surrounded and surmounted by additional protection.

The increased thickness of the slab 12 makes it possible, bearing in mind the relatively reduced dimensions of the housings for the component heads, to increase its strength and rigidity for a given steel mass and to reduce the sag linked with the heating of the underface.

This increased thickness facilitates the construction and inspection of the metal part, as well as the introduction of the concrete filling.

By separating the problem of the strength of the slab from that of the construction of the components, a better evolution of the design of projects is possible.

I claim:

1. A liquid metal-cooled nuclear reactor comprising a vessel containing a liquid metal in which the reactor core is to be immersed, said vessel being sealed by a structurally uniform and rigid slab having a thickness greater than the height of the pump structure and heat exchanger structure which are housed in said slab, said slab having a central opening in which is located at least one rotary plug overhanging said reactor core and peripheral openings arranged in the form of a ring around said central opening, at least one pump being suspended in one of said peripheral openings and at least one heat exchanger being suspended in another of said peripheral openings, both of said at least one pump and said at least one heat exchanger being positioned in said liquid metal and wherein at least one of said peripheral openings through which is suspended said heat exchanger comprises a first housing contained within said rigid slab so as to confine the heat exchanger head, said first housing being sealed by a cover located above the heat exchanger head; wherein one of the said peripheral openings through which is suspended said pump comprises a second housing contained within the rigid slab so as to confine the upper part of said pump including the pump head, at least one part of a vertical drive shaft connecting said pump to a motor and a flywheel carried by said shaft, said second housing being sealed by a cover positioned above the pump head and below the pump motor; wherein said first housing extends radially outwardly of the slab through a wall sealingly connected to the slab in such a way that said first housing provides a passage for the pipes of a secondary cooling circuit of the heat exchanger, said pipes extending from said heat exchanger and traversing said wall; wherein said second housing is extended radially outwardly into said slab so as to form a large horizontal passageway, said horizontal passageway being connected to a vertical passageway which extends only from said horizontal passageway to the top of said slab; wherein the thick slab contains another housing for handling fuel, said other housing being connected to the interior of the vessel and to a fuel handling installation by two transfer devices; wherein said rotary plug is covered by a detachable cover fixed to the slab; and wherein the thick slab has a rigid structure formed from steel sheets for constituting recesses and wherein each recess is provided in its floor with a lining of neutron-absorbing material.

2. A reactor as in claim 1, wherein at least the first housing is tightly sealed to be capable of holding inert gas.

* * * * *